(12) United States Patent
Camisasca et al.

(10) Patent No.: US 10,583,703 B2
(45) Date of Patent: Mar. 10, 2020

(54) TIRE VALVE CAP

(71) Applicant: CAMISASCA AUTOMOTIVE MANUFACTURING, INC., Lake Forest, CA (US)

(72) Inventors: Henry P. Camisasca, Lake Forest, CA (US); Colin Camisasca, Lake Forest, CA (US)

(73) Assignee: Camisasca Automotive Manufacturing, Inc., Lake Forest, CA (US)

( * ) Notice: Subject to any disclaimer, the term of this patent is extended or adjusted under 35 U.S.C. 154(b) by 0 days.

(21) Appl. No.: 16/021,767

(22) Filed: Jun. 28, 2018

(65) Prior Publication Data

US 2019/0176550 A1     Jun. 13, 2019

Related U.S. Application Data

(60) Provisional application No. 62/611,872, filed on Dec. 29, 2017, provisional application No. 62/596,689, filed on Dec. 8, 2017.

(51) Int. Cl.
*B60C 29/06* (2006.01)
*F16K 15/20* (2006.01)

(52) U.S. Cl.
CPC ............ *B60C 29/066* (2013.01); *B60C 29/06* (2013.01); *F16K 15/20* (2013.01)

(58) Field of Classification Search
CPC .............................. B60C 29/06; B60C 29/066
USPC ........................................ 138/89.4; 137/382
See application file for complete search history.

(56) References Cited

U.S. PATENT DOCUMENTS

| 1,122,613 | A | * | 12/1914 | Kraft et al. | B60C 29/06 |
| | | | | | 138/89.4 |
| 1,178,091 | A | | 4/1916 | Miller | |
| 1,223,716 | A | | 4/1917 | Miller | |
| 1,229,928 | A | | 6/1917 | Frazer | |
| 1,253,573 | A | * | 1/1918 | Burke | B60C 29/06 |
| | | | | | 138/89.4 |
| 1,322,905 | A | * | 11/1919 | Just | B60C 29/06 |
| | | | | | 138/89.4 |
| 1,328,488 | A | * | 1/1920 | Bowden | F16K 27/12 |
| | | | | | 138/89.4 |
| 1,328,801 | A | * | 1/1920 | Bowden | B60C 29/06 |
| | | | | | 138/89.4 |
| 1,338,054 | A | | 4/1920 | Vollmer | |

(Continued)

FOREIGN PATENT DOCUMENTS

GB              207472 A        11/1923

OTHER PUBLICATIONS

Extended European Search Report for Appl. No. EP18210605 dated Feb. 13, 2019 in 7 pages.

*Primary Examiner* — Patrick F Brinson
(74) *Attorney, Agent, or Firm* — Knobbe Martens Olson & Bear LLP

(57) ABSTRACT

A tire valve cap having an ABS thread shield that will not interact with the different metal valve stems used on today's vehicles. The ABS insert uses a unique snap in ring design with anti-twist taps that hold the insert into an outer metal cap and at the same time will not twist around inside the cavity of the metal outer cap. Further, the cap includes a unique manner of holding the stem seal in place by using an over-molded in seal (e.g., square O-ring) that will not dislodge with use.

20 Claims, 9 Drawing Sheets

(56) References Cited

U.S. PATENT DOCUMENTS

| | | | |
|---|---|---|---|
| 1,346,073 A | | 7/1920 | Adams |
| 1,406,133 A | | 2/1922 | Wright |
| 1,436,462 A | | 11/1922 | Schweinert |
| 1,456,245 A | | 5/1923 | Mang |
| 1,478,055 A | * | 12/1923 | Parker .................... B60C 29/06 138/89.4 |
| 1,491,485 A | | 4/1924 | McKenzie |
| 1,501,361 A | * | 7/1924 | Myers .................... B60C 29/06 138/89.4 |
| 1,621,300 A | * | 3/1927 | Woolsey ................. B60C 29/06 138/89.3 |
| 6,102,064 A | * | 8/2000 | Robinson ................ B60C 29/06 137/232 |
| 6,279,600 B1 | | 8/2001 | Robinson |
| 6,543,467 B2 | | 4/2003 | Robinson |
| 7,770,601 B2 | * | 8/2010 | Perry ..................... B60C 29/06 137/232 |
| 9,789,843 B1 | * | 10/2017 | Hui ........................ H01F 7/021 |
| 2007/0251580 A1 | * | 11/2007 | Perry ..................... B60C 29/06 137/382 |
| 2013/0037127 A1 | | 2/2013 | Allen |

* cited by examiner

TIRE VALVE CAP

CROSS-REFERENCE TO RELATED APPLICATIONS

This application claims benefit under 35 U.S.C. § 119(e) to U.S. Provisional Patent Application No. 62/596,689, filed Dec. 8, 2017 and U.S. Provisional Patent Application No. 62/611,872, filed Dec. 29, 2017, both of which are incorporated in entirety by reference herein.

BACKGROUND

Field

The present application is directed generally toward cap assemblies for tire valve stems, and specifically toward a two-piece cap assembly that includes a threaded insert.

Description of the Related Art

Tire valve caps are used by manufactures and/or consumers, such as for example in the automotive industry, to hide or cover the threaded end of a tire valve. Such caps provide aesthetic appeal and also protect the valve from dirt and/or debris or from the unintentional release of air. A challenge manufacturers of valve caps face is that some materials that may be desirable for an exterior of the valve cap can react with the materials commonly used for valve threads and materials that do not react with the valve thread material can be undesirable for the exterior of the cap for aesthetics or performance reasons. Thus, a need exists for a tire valve cap that addresses this challenge or provides the public with a useful choice.

SUMMARY OF THE INVENTION

The systems, methods and devices described herein have innovative aspects, no single one of which is indispensable or solely responsible for their desirable attributes. Without limiting the scope of the claims, some of the advantageous features will now be summarized.

In accordance with at least one embodiment disclosed herein, a valve stem cap device can comprise a cap member comprising one or more recesses disposed on an interior wall of the cap member. The device can further comprise an insert member comprising a threaded interior wall configured to thread onto a valve stem, the insert member further configured to be inserted into the cap member and coupled to the cap member via a snap-fit engagement. The insert member can further comprise one or more protrusions on an exterior of the insert member, the protrusions configured to engage with the recesses of the cap member, such that the insert member is prevented from rotating relative to the cap member.

BRIEF DESCRIPTION OF THE DRAWINGS

These and other features and advantages of the present embodiments will become more apparent upon reading the following detailed description and with reference to the accompanying drawings of the embodiments, in which.

DETAILED DESCRIPTION

For convenience, the embodiments disclosed herein are described in the context of a tire valve cap assembly for use with tire valves on a wheeled vehicle, such as an automobile. However, the embodiments can also be used with other products and/or components which incorporate a threaded valve stem or are otherwise threaded. For example, the embodiments can be used to couple with a variety of threaded stems. Various other uses may also be possible.

Various features associated with different embodiments will be described below. All of the features of each embodiment, individually or together, can be combined with features of other embodiments, which combinations form part of this disclosure. Further, no feature is critical or essential to any embodiment.

Figure 1:
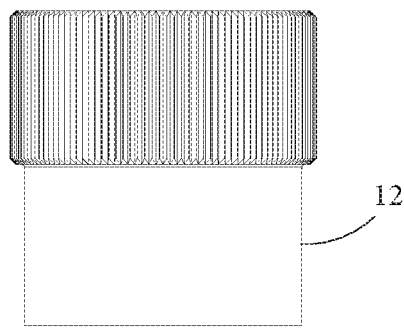
FIG. 1 is a front exploded view of an embodiment of a tire valve cap device.
Figure 1:
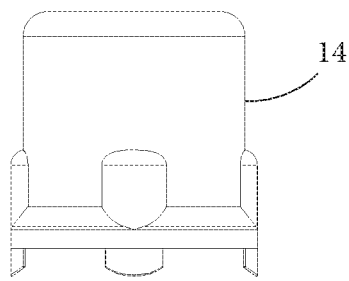
Figure 1:

With reference to FIG. 1, a tire valve cap device 10 can comprise a device for substantially surrounding an end of a valve stem so as to limit access to and visibility of the valve stem. For example, the device 10 can comprise a cap member 12, an insert member 14, and a seal 15 (e.g., square O-ring). The cap member 12 and insert member 14 can vary in size and shape. In some embodiments, both the cap member 12 and insert member 14 can have a generally circular or cylindrical shape. The cap member 12 can be configured to couple with the insert member 14, for example by a snap-fit or press-fit engagement, described in more detail below. Both the cap member 12 and insert member 14 can be made from the same type of material. For example, in some embodiments, the cap member 12 and insert member 14 can be comprised of plastic, such as Acrylonitrile Butadiene Styrene (ABS) plastic, or other suitable plastic. In some embodiments, one or more of the cap member 12 and insert member 14 can be comprised of aluminum, stainless steel, or other types of metal. Other materials are also possible. In some embodiments, the cap member 12 can be comprised of a different material than the insert member 14. In some embodiments, the cap member 12 can comprise components which are made from different materials. Similarly, in some embodiments, the insert member 14 can comprise components which are made from different materials. The cap member 12 and/or insert member 14 can be injected molded, machined, stamped, a combination of these or made by other suitable manufacturing methods.

Figure 2:
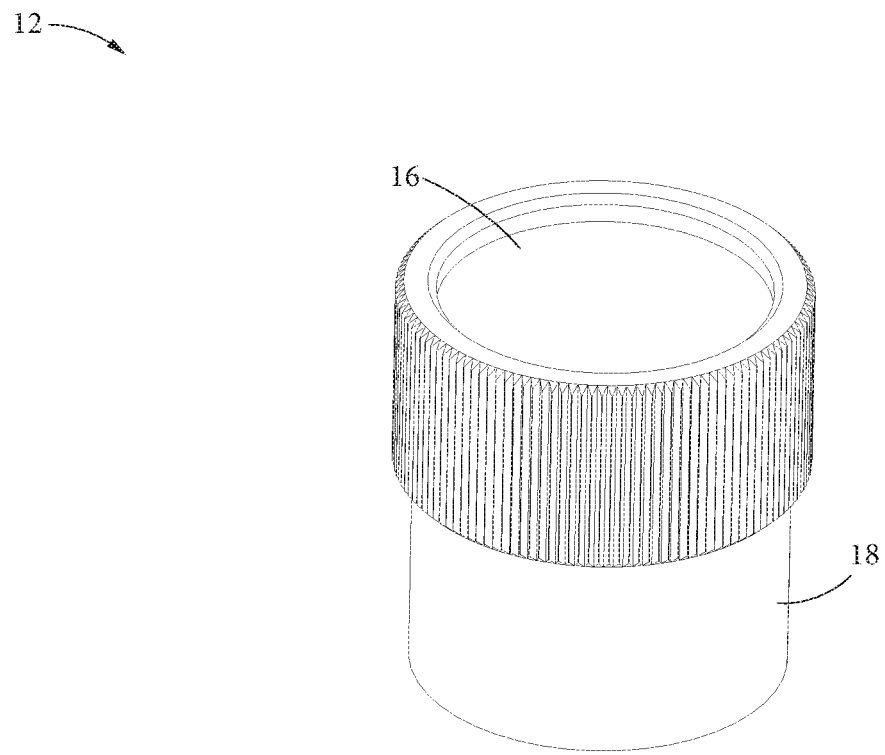
FIG. 2 is a top perspective view of a cap member of the device of FIG. 1.

With reference to FIG. 2, the cap member 12 can comprise a generally cup-like (e.g. cylindrical) shape having a generally flat surface along a top portion 16 of the cap member 12. The surface of the top portion 16 can be well-suited for the application of a design. Other shapes and sizes for the cap member 12 are also possible. In some embodiments, the cap member 12 can comprise a side wall 18 extending along an axis of rotation. The side wall 18 forming a cylinder. The cap member 12 can further include a ridged or textured exterior. The shape and/or contour of the cap member 12 can make it possible to grip the cap member 12 by hand or with tools such that the cap member 12 can be rotated relative to the valve stem in order to separate the cap device 10 from valve stem.

Figure 3:
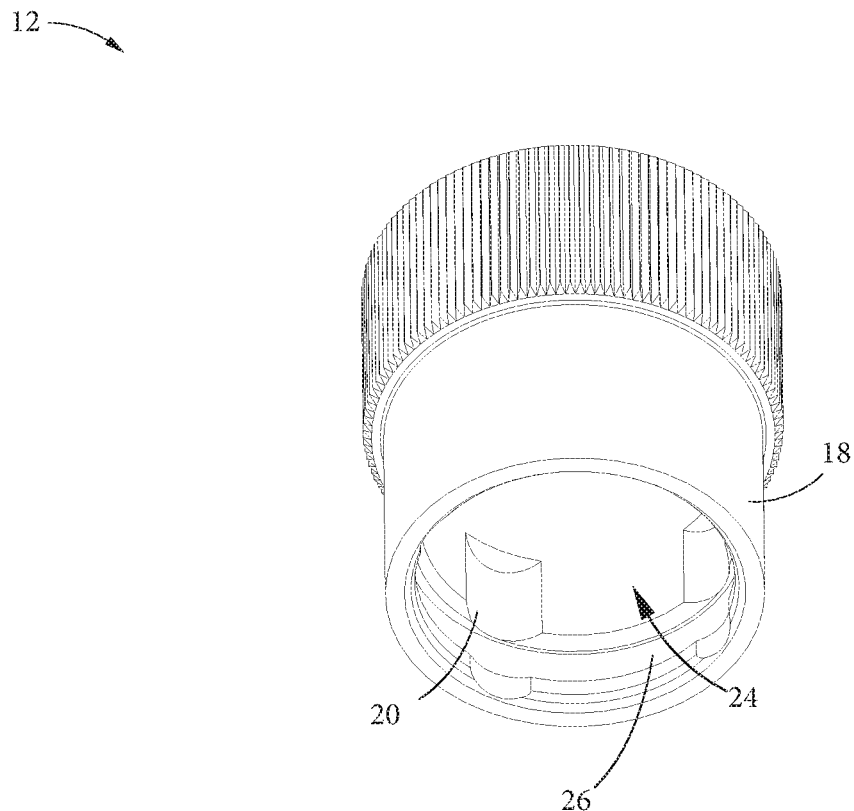
FIG. 3 is a bottom perspective view of the cap member of FIG. 2.
Figure 4:
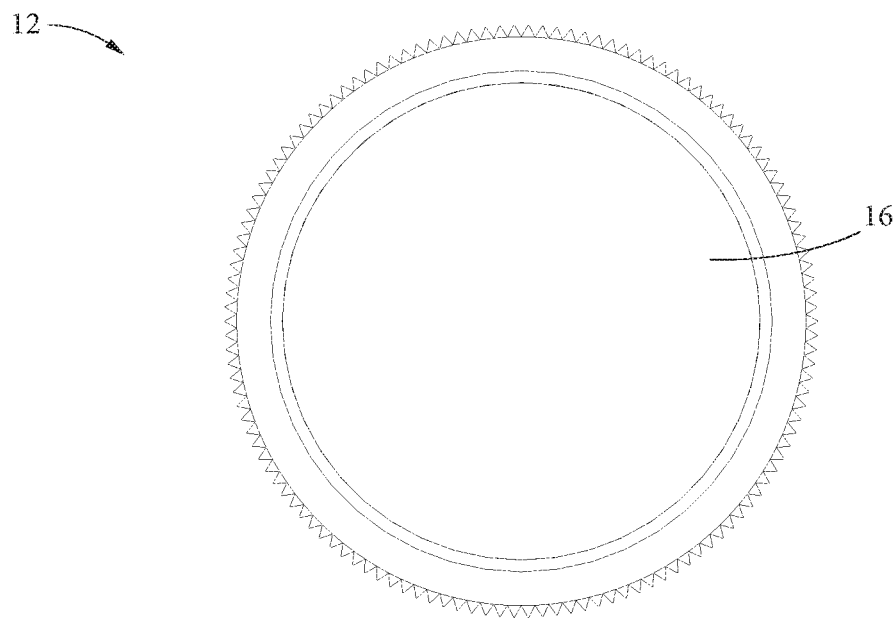
FIG. 4 is a top view of the cap member of FIG. 2.
Figure 5:
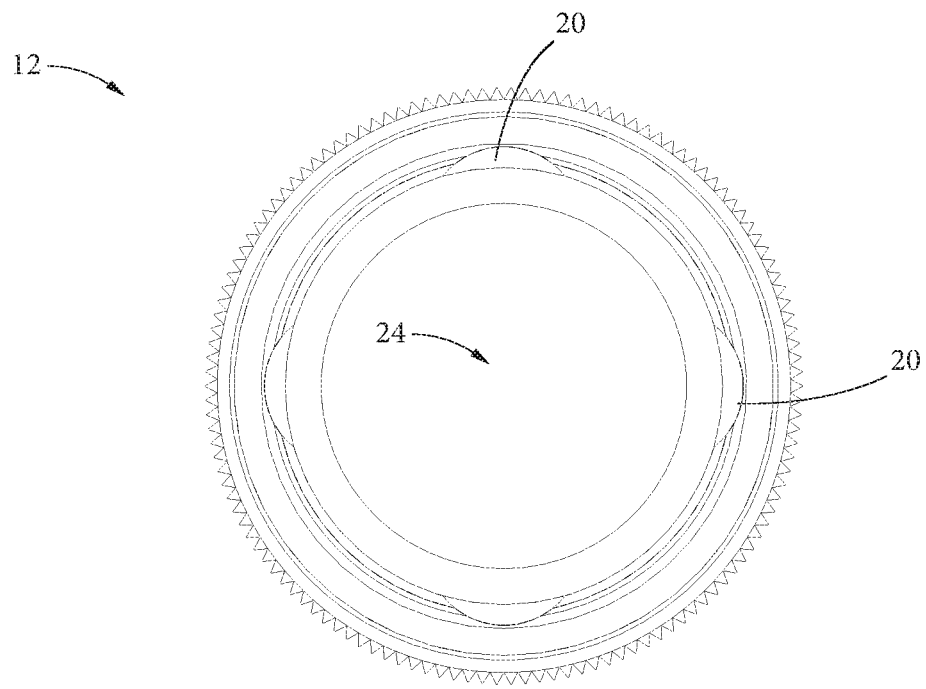
FIG. 5 is a bottom view of the cap member of FIG. 2.
Figure 6:
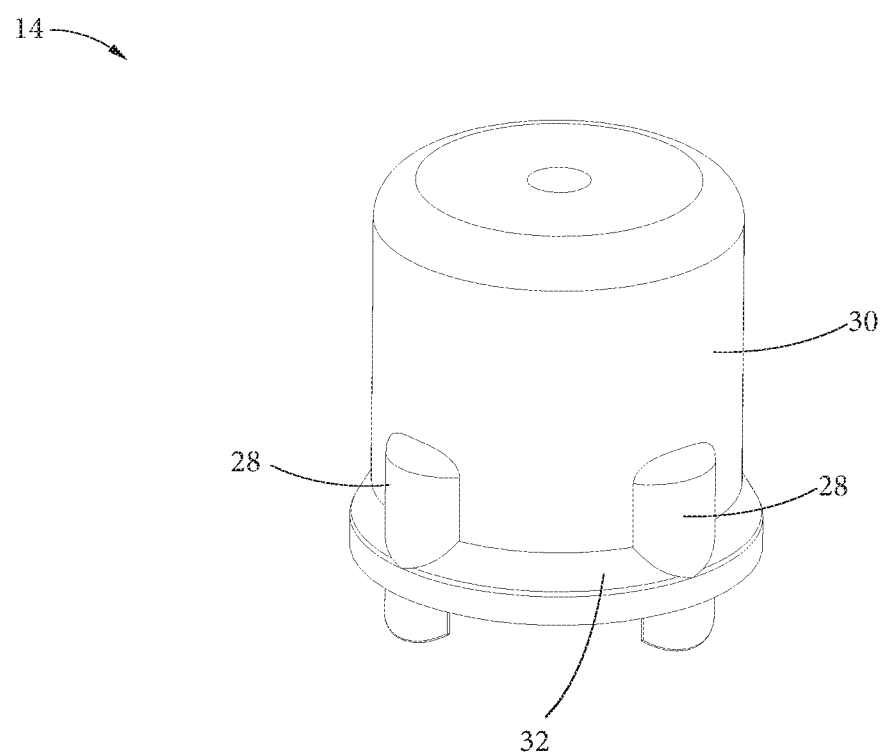
FIG. 6 is a top perspective view of an insert member of the device of FIG. 1.
Figure 7:
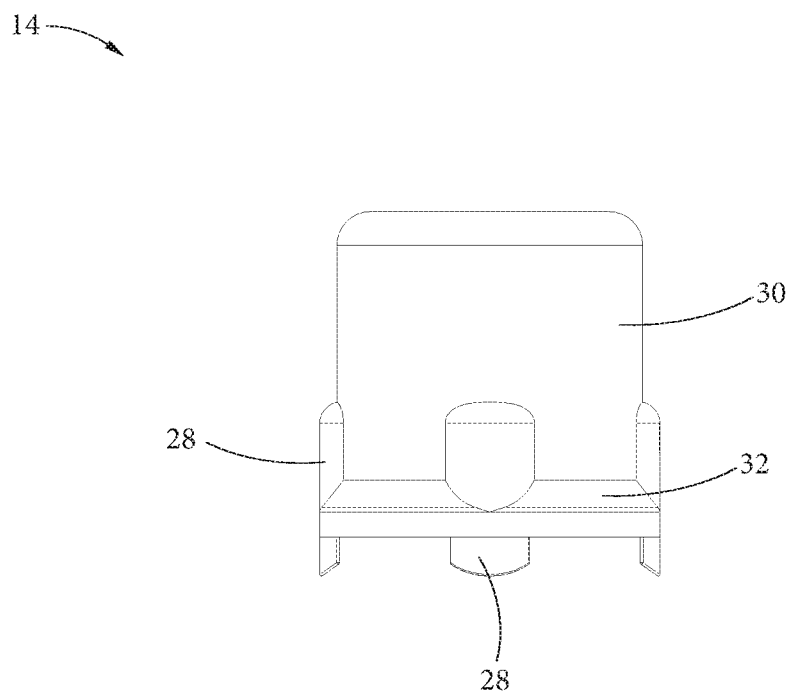
FIG. 7 is a front view of the insert member of FIG. 6.
Figure 8:
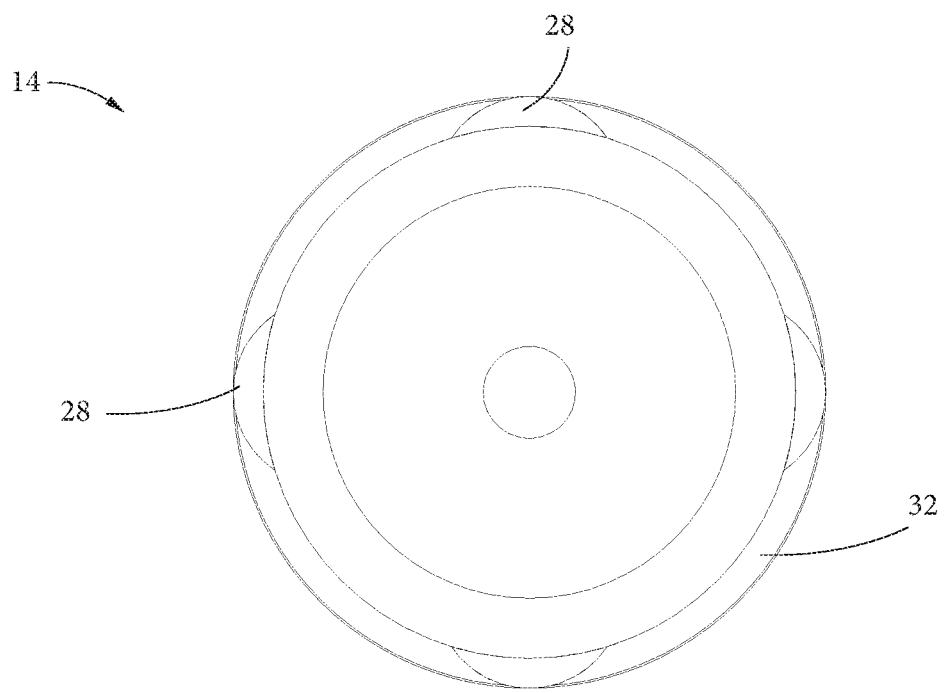
FIG. 8 is a top view of the insert member of FIG. 6.
Figure 9:
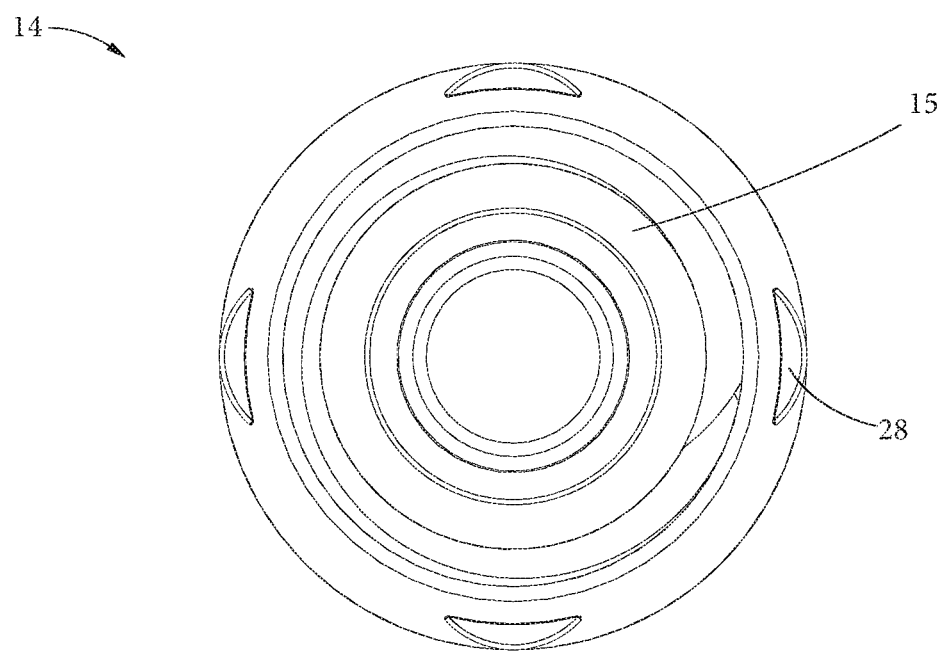
FIG. 9 is a bottom view of the insert member of FIG. 6.
Figure 10:
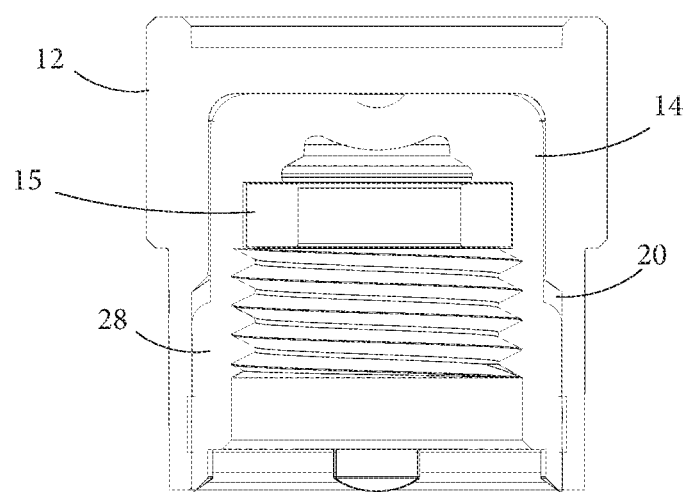
FIG. 10 is a front cross-sectional view of the device of FIG. 1 with the insert member inserted into the cap member.
Figure 11:
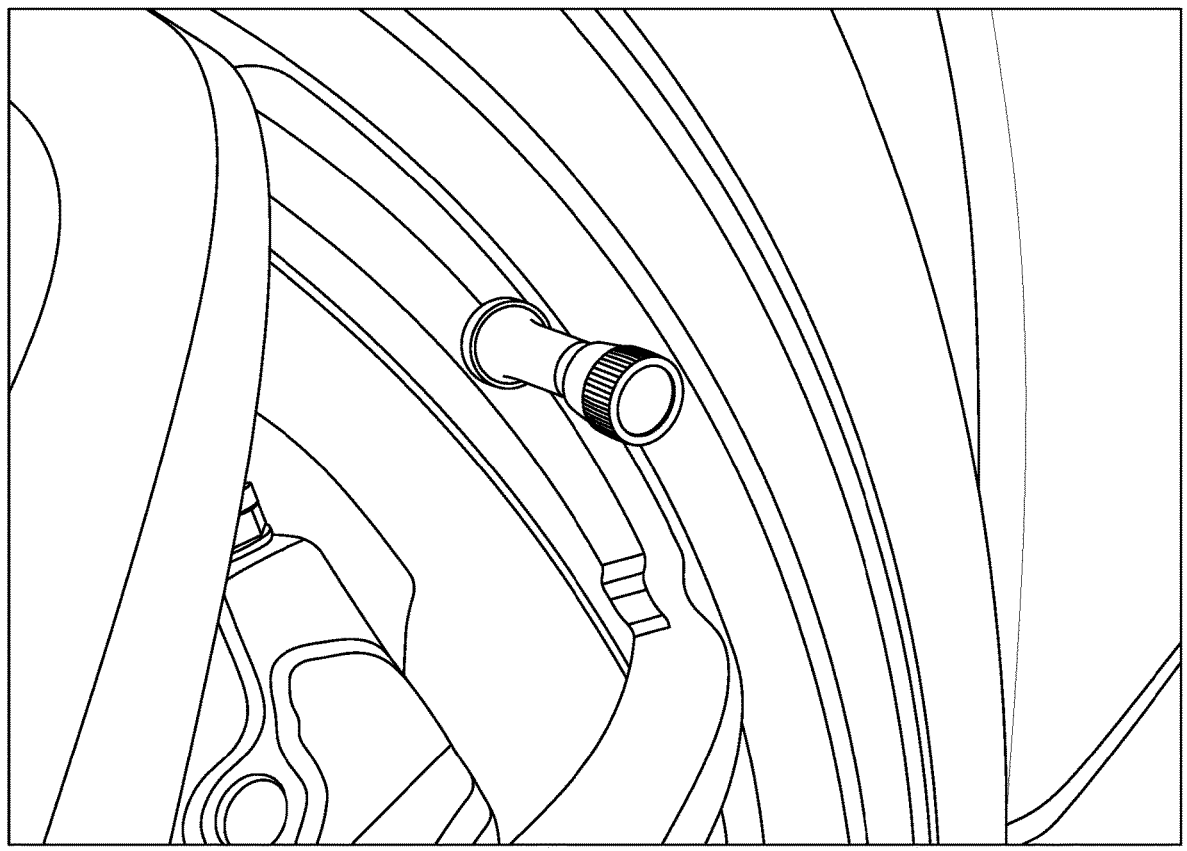
FIG. 11 is a perspective view of the tire valve cap device of FIG. 1 as used, for example on the tire valve stem of a vehicle.

With reference to FIGS. 3 and 5, the interior of wall 18 of the cap member 12 can include a plurality of recesses 20. As described in greater detail below, the recesses 20 can be used to prevent rotational motion of the cap member 12 relative to the insert member 14. The cap member 12 can further comprise a groove 26 circumferentially disposed about the interior 24 of the cap member 12. In the illustrated arrangement, the recesses 20 are evenly distributed around the circumference of the interior 24 of the cap member 12 and extend in an axial direction of the cap member 12. The recesses 20 define a part-cylindrical shape; however, other shapes are also possible. In the illustrated arrangement, the groove 26 interrupts the recesses 20 such that a portion of each of the recesses 20 is located both above and below the groove 26. The illustrated grooves 26 extend all the way to or open to a lower, open end of the cap member 12.

With continued reference to FIGS. 3 and 5, the cap member 12 can define an interior 24. The interior 24 can be configured to house the insert member 14. In some embodiments, the cap member 12 can have a diameter that ranges between approximately 10-13 millimeters. Further, the insert member 14 can include the over-molded in seal 15. The seal 15 can be disposed in the interior of the insert member 14 near a top end. The seal 15 can be configured to contact an upper end of the valve stem and create a seal between the cap member 12 and the valve stem. In the illustrated arrangement, the seal 15 is an O-ring, which can have a square cross-sectional shape. However, the seal 15 could have a circular cross-sectional shape, or other suitable shapes. The seal 15 can be configured to keep the valve orifice clean and protected from dirt or debris.

With reference to FIGS. 6-10, the insert member 14 can be generally cup-like (e.g. cylindrical). Other shapes and sizes for the insert member 14 are also possible. The insert member 14 can comprise a side wall 30 that extends circumferentially, forming an interior of the insert member 14. The insert member 14 can further include a threaded interior surface configured to screw onto a valve stem. The insert member 14 can include tabs or protrusions 28 that extend from the exterior of the side wall 30. The protrusions 28 can be sized and shaped to fit into the recesses 20 of the cap member 12. The engagement between the protrusions 28 and the recesses 20 can be such that the insert member 14 is prevented from being rotated relative to the cap member 12 when the protrusions 28 and recesses 20 are engaged. In other words, the insert member 14 and the cap member 12 are rotationally fixed with respect to one another. The recesses 20 and the protrusions 28 can be shaped such that the protrusions 28 can enter or slide into the recesses 20 in response to linear motion along a common axis.

With continued reference to FIGS. 6-10, the insert member 14 can comprise a lip 32. In some embodiments, the lip 32 is disposed circumferentially about the side wall 30 of the insert member 14. The lip 32 can be configured to extend outward from the side wall 30. The lip 32 can be configured to snap into the groove 26 of the cap member 12. For instance, the lip 32 can be disposed circumferentially about the insert member 14 and can include a diameter that is greater than the diameter of the interior 24 of the cap member 12 outside of the groove 26 and recesses 20. This can cause the lip 32 to flex or bend and/or the cap member 12 to expand when the insert member 14 is inserted into the cap member 12. Thus, the insert member 14 can be assembled to the cap member 12 by an interlocking or snap-fit connection, which secures the components relative to one another in at least an axial direction. In other arrangements, the insert member 14 can be connected to the cap member 12 by an interference or press-fit, adhesives, mechanical coupling or other suitable arrangements. In some embodiments, the protrusions 28 extend below the lip 32 such that the recesses 20 are entirely filled by the protrusions 28.

In some embodiments, the insert member 14 can be approximately 9-11 millimeters in diameter. Other sizes and diameters outside of this range are also possible. However, preferably, the insert member 14 is sized to correspond with a size of the interior 24 of the cap member 12 for a snug fit between the two components.

Assembly of the device 10 will now be described according to one embodiment. Before coupling of the cap member 12 and the insert member 14, the protrusions 28 and the recesses 20 are aligned to allow for insertion of the insert member 14 into the cap member 12. As the insert member 14 is inserted into the cap member 12, the lip 32 contacts the wall 18, causing the lip 32 and/or wall 18 to flex or bend and/or the insert member 14 to compress. As the insert member 14 continues to be inserted into the cap member 14, the lip 32 will reach the groove 26, thereby allowing the lip 32 to expand into the space created by the groove 26 to securely couple the cap member 12 and the insert member 14. Engagement of the lip 32 and the groove 26 inhibits or prevents subsequent undesirable separation of the insert member 14 and the cap member 12. In some embodiments, the lip 32 and/or bottom rim of the cap member is angled or tapered to allow the lip 32 to more easily enter the interior 24 of the cap member 12. Once the insert member 14 snaps into the cap member 12, the device 10 can be coupled to a valve stem, for instance, a valve stem of a car tire. The device 10 can be threaded onto the valve stem using the threads disposed on the interior wall of the insert member 14. As the device is tightened and/or removed from the valve stem, the cap member 12 is kept rotationally fixed relative to the insert member 14 via the engagement between the recesses 20 and protrusions 28

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combinations or sub-combinations of the specific features and aspects of the embodiments can be made and still fall within the scope of the inventions.

It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A valve stem cap device comprising:
a cap member comprising a plurality of recesses that extend in an axial direction of the cap member and are distributed circumferentially on an interior wall of the cap member;
an insert member comprising a threaded interior wall configured to thread onto a valve stem, the insert member further configured to be inserted into the cap member and coupled to the cap member via a snap-fit engagement, the insert member further comprising one or more protrusions on an exterior of the insert member, the protrusions configured to engage with the plurality of recesses of the cap member, such that the insert member and the cap member are rotationally fixed with respect to each other.

2. The valve stem cap device of claim 1, further comprising a seal that is over-molded into the insert member.

3. The valve stem cap device of claim 1 further comprising:
a groove disposed on the interior wall of the cap member; and
a lip disposed on the exterior wall of the insert member, wherein the lip is configured to flex inward and/or the groove is configured to flex outward in response to the insert member being inserted into the cap member and wherein the lip and/or the groove returns towards its shape in response to the lip entering the groove, thereby securely coupling the insert member to the cap member.

4. The valve stem cap device of claim 3, wherein the groove is disposed circumferentially about the interior wall of the cap member, and wherein the lip is disposed circumferentially about the exterior of the insert member.

5. The valve stem cap device of claim 1, wherein the cap member is configured to expand in response to the insert member being inserted into the cap member.

6. The valve stem cap device of claim 3, wherein the protrusion and the lip are defined by the same component.

7. The valve stem cap device of claim 3, wherein the plurality of recesses and the groove are defined by the same component.

8. The valve stem cap device of claim 1, wherein the cap member comprises a first material and the insert member comprises a second material different from the first material.

9. The valve stem cap device of claim 8, wherein the first material is a metal and the second material is a plastic.

10. The valve stem cap device of claim 9, wherein the second material is ABS.

11. A valve stem cap device comprising:
a cap member comprising one or more recesses disposed on an interior wall of the cap member, wherein each of the one or more recesses comprises two edges and a continuous surface extending between the two edges;
an insert member comprising a threaded interior wall configured to thread onto a valve stem, the insert member further configured to be inserted into the cap member and coupled to the cap member via a snap-fit engagement, the insert member further comprising one or more protrusions on an exterior of the insert member, the protrusions configured to engage with the recesses of the cap, such that the insert member is prevented from rotating relative to the cap member.

12. The valve stem device of claim 11, wherein the insert member and the cap member are rotationally fixed with respect to each other.

13. The valve stem device of claim 11, wherein the one or more recesses each define a part-cylindrical shape.

14. The valve stem cap device of claim 11, further comprising a seal that is over-molded into the insert member.

15. The valve stem cap device of claim 11, further comprising:
a groove disposed on the interior wall of the cap member; and
a lip disposed on the exterior wall of the insert member, wherein the lip is configured to flex inward and/or the groove is configured to flex outward in response to the insert member being inserted into the cap member and wherein the lip and/or the groove returns towards its shape in response to the lip entering the groove, thereby securely coupling the insert member to the cap member.

16. The valve stem cap device of claim 15, wherein the groove is disposed circumferentially about the interior wall of the cap member, and wherein the lip is disposed circumferentially about the exterior of the insert member.

17. The valve stem cap device of claim 11, wherein the cap member is configured to expand in response to the insert member being inserted into the cap member.

18. The valve stem cap device of claim 15, wherein the protrusion and the lip are defined by the same component.

19. The valve stem cap device of claim 1, wherein the plurality of recesses are evenly distributed around the circumference of the interior wall of the cap member.

20. The valve stem cap device of claim 11, wherein the one or more protrusions are evenly distributed around a circumference of the exterior of the insert member.

* * * * *

UNITED STATES PATENT AND TRADEMARK OFFICE
CERTIFICATE OF CORRECTION

| | |
|---|---|
| PATENT NO. | : 10,583,703 B2 |
| APPLICATION NO. | : 16/021767 |
| DATED | : March 10, 2020 |
| INVENTOR(S) | : Camisasca et al. |

Page 1 of 1

It is certified that error appears in the above-identified patent and that said Letters Patent is hereby corrected as shown below:

In the Specification

In Column 4, Line 45, change "28" to --28.--.

In the Claims

In Column 6, Line 14, in Claim 12, after "stem" insert --cap--.

In Column 6, Line 17, in Claim 13, after "stem" insert --cap--.

Signed and Sealed this
Tenth Day of November, 2020

Andrei Iancu
*Director of the United States Patent and Trademark Office*